United States Patent
Poor

(10) Patent No.: US 7,316,347 B2
(45) Date of Patent: Jan. 8, 2008

(54) LINKING ARTICLES TO CONTENT VIA RFID

(75) Inventor: David Deas Sinkler Poor, Meadowbrook, PA (US)

(73) Assignee: CTB McGraw-Hill, Monterey, CA (US)

( * ) Notice: Subject to any disclaimer, the term of this patent is extended or adjusted under 35 U.S.C. 154(b) by 0 days.

(21) Appl. No.: 11/030,305

(22) Filed: Jan. 7, 2005

(65) Prior Publication Data

US 2006/0151592 A1 Jul. 13, 2006

(51) Int. Cl.
*G06F 17/00* (2006.01)

(52) U.S. Cl. ............... 235/375; 235/385; 235/487

(58) Field of Classification Search ........ 235/375, 235/462.01, 472, 385, 487, 470, 381, 472.01, 235/472.02; 707/1, 10; 705/1, 10, 27, 28
See application file for complete search history.

(56) References Cited

U.S. PATENT DOCUMENTS

| | | | |
|---|---|---|---|
| 5,624,265 A | 4/1997 | Redford et al. | |
| 5,749,735 A | 5/1998 | Redford et al. | |
| 5,757,304 A | 5/1998 | Redford et al. | |
| 5,763,112 A | 6/1998 | Redford | |
| 5,788,507 A | 8/1998 | Redford et al. | |
| 5,804,803 A * | 9/1998 | Cragun et al. ............... | 235/375 |
| 5,839,905 A | 11/1998 | Redford et al. | |
| 5,911,582 A | 6/1999 | Redford et al. | |
| 5,933,829 A * | 8/1999 | Durst et al. .................. | 707/10 |
| 6,259,367 B1 * | 7/2001 | Klein ....................... | 340/572.1 |
| 6,327,459 B2 | 12/2001 | Redford et al. | |
| 6,330,971 B1 | 12/2001 | Mabry et al. | |
| 6,377,986 B1 | 4/2002 | Philyaw et al. | |
| 6,633,881 B2 * | 10/2003 | Drobish et al. ............. | 707/100 |
| 6,793,129 B2 | 9/2004 | Wood et al. | |
| 6,907,568 B1 * | 6/2005 | Meyers ....................... | 715/700 |
| 6,965,866 B2 * | 11/2005 | Klein ........................ | 705/1 |
| 6,967,577 B2 * | 11/2005 | Taylor et al. ............. | 340/572.1 |
| 2001/0054082 A1 * | 12/2001 | Rudolph et al. ............. | 709/217 |
| 2002/0035571 A1 * | 3/2002 | Coult ....................... | 707/104.1 |
| 2002/0077899 A1 | 6/2002 | Kaneko et al. | |
| 2003/0024975 A1 * | 2/2003 | Rajasekharan ............... | 235/375 |
| 2003/0055667 A1 * | 3/2003 | Sgambaro et al. ........... | 705/1 |
| 2003/0077558 A1 | 4/2003 | Wood et al. | |
| 2003/0120745 A1 * | 6/2003 | Katagishi et al. ........... | 709/217 |
| 2003/0217267 A1 * | 11/2003 | Kindberg ..................... | 713/168 |
| 2004/0149824 A1 * | 8/2004 | Miller et al. ................ | 235/385 |
| 2004/0193676 A1 * | 9/2004 | Marks ........................ | 709/203 |
| 2004/0206809 A1 | 10/2004 | Wood et al. | |

(Continued)

*Primary Examiner*—Thien M. Le
*Assistant Examiner*—Edwyn Labaze
(74) *Attorney, Agent, or Firm*—Rothwell, Figg, Ernst & Manbeck, P.C.

(57) ABSTRACT

A method and system to link an article such as a publication to supplemental content through the use of an RFID tag embedded or attached to the article. Based on the electronic data within the RFID tag, a computer system or other network enabled device obtains specific and appropriate supplemental content for the publication or for a specific copy of a the publication. While the primary application of the invention deals with printed publications, connecting to a server as the source of the supplemental content via a network or the internet, and displaying supplemental content through a standard browser, the system and method can be advantageously used to obtain supplemental content for a variety of documents or objects and the content can be obtained from a variety of sources.

14 Claims, 8 Drawing Sheets

U.S. PATENT DOCUMENTS

| | | |
|---|---|---|
| 2005/0082359 A1 | 4/2005 | Marggraff et al. |
| 2005/0175973 A1 | 8/2005 | Miller |
| 2005/0193060 A1* | 9/2005 | Barton .................... 709/204 |
| 2005/0219591 A1 | 10/2005 | Marggraff et al. |
| 2005/0242167 A1* | 11/2005 | Kaario et al. ............ 235/375 |
| 2006/0043201 A1* | 3/2006 | Vesikivi et al. ............ 235/492 |
| 2006/0168644 A1* | 7/2006 | Richter et al. ................ 726/2 |
| 2006/0208889 A1* | 9/2006 | Shaffer et al. .......... 340/572.1 |
| 2007/0138270 A1* | 6/2007 | Reblin ...................... 235/383 |

* cited by examiner

Figure 3

| Number | Data Field | | Sample Value | |
|---|---|---|---|---|
| | Unique Tag ID | (210) | E007000018537759 | (210') |
| 1 | Base URL | (220) | http://www.businessweek.com/magazine/toc/04_35/B3897/magazine.htm | (220') |
| 2 | Prompt Text | (230) | More information for this issue of Business Week | (230') |
| 3 | Category Codes | (240) | MGHLink:000010000 | (240') |
| 4 | Parameters | (250) | | (250') |

Figure 8

PAUSE
RESUME
PRIOR LINK
UPDATE
OPEN
HELP
EXIT

Linking Articles to Content Via RFID

BACKGROUND OF THE INVENTION

1. Field of the Invention

The current invention relates generally to automatically linking specific articles to supplemental content available on the internet or within a corporate network. The supplemental content is generally provided through a standard browser on an internet-enabled device: typically a computer. This automated linkage has particular applications within a variety of articles, such as publications, including, but not limited to, books, magazines, customized reports, such as stock portfolio and performance reports, textbooks, periodicals, and student work books. The current invention further shows how content can be specific to the volume or edition of a publication, specific to a particular copy of a publication, or specific to the user.

In the context of this disclosure, the term "content" broadly means communication data transmitted to a recipient of the data and may include information, requests for information (e.g., a survey), or entertainment (e.g., music, video games, movies, etc.). The content can take many forms, including, but not limited to, text, still graphics (i.e., fixed, visually perceptible communication data, such as, charts, photographs, or drawings), video graphics (i.e., moving, visually perceptible communication data, such as streaming video, motion pictures, etc.), or audio (i.e., aurally perceptible communication data). The content is referred to as "supplemental" content because it is content that is in addition to i.e., it supplements) the content conveyed by or otherwise embodied in the article on which the RFID tag is attached or embedded.

In addition to application with publications, which are primarily paper-based presentations, other articles with which the present invention may be applied include software as stored on portable electronic storage media, portable audio-visual recording media (such as digital video discs ("DVD's") or video cassette tapes), audio recording media (such as compact discs ("CD's") or audio cassette tapes), or packaging of varying types.

Content specific to a volume or edition might well be used for magazines, books, and periodicals. In this invention, content tied to that specific edition or volume is made available. An exemplary application would be for specific sales materials: for instance a real-estate agent might send out a single page of information on a property. The supplemental content might include a virtual tour of the facility leading to links to other offerings from the same agency.

Content specific to a copy might well be used for a customized report. In the case of a customized report such as a stock portfolio and performance report, the supplemental content might be the client's "home page" on the financial institution's on-line system. Another application with content specific to a copy includes tagging exhibits for a legal proceeding. While all documents will be either a plaintiff's exhibit or a defendant's exhibit, the supplemental content will be unique for each document.

The current invention also discloses how to customize content without relying on invasive personal identification. In the case of a student workbook, the current invention shows methods to adjust the content based on work completed so that the supplemental content always comes back to where the student left off previously, but without depending on any information that identifies the particular student.

Because of concerns for privacy and concerns that usage data may be misused, the current invention will generally function appropriately without any need to know who is using a particular publication. For some applications, however, functionality can be enhanced by maintaining the user's identification and adjusting content based on information about the user. Within an educational setting, for example, a student might be asked to enter identifying information which can then enable content adjusted for performance on tests and other measures. With this approach, content and tasks can be selected to provide supplemental materials needed for remediation if needed, or for advanced lessons when appropriate.

As described in the current invention, the linkage is established by data stored within a Radio Frequency Identification (RFID) "tag" or "transponder". In the preferred embodiment of the invention, the stored data include a specific URL with optional parameters to ensure that the appropriate content is provided. Using a specialized reader and specialized software running on an internet-enabled computer, the current invention provides a method and apparatus to make the supplemental content available whenever a publication with an enabled tag is placed near the reader. In the preferred embodiment of the invention, the data are unencrypted and stored as text. If appropriate, the data can include codes that are keys to appropriate sites. Additionally the data can be encrypted so that only an authorized reader and software can be used.

2. Background Art

Within almost every magazine and book published today, one or more web addresses are included so that the reader can go to supplemental information for advertised products or editorial content. In order to get to the content, however, the reader must first open a browser on a computer or other device, and then manually enter the URL or web address.

A product was developed to simplify this process based on Philyaw et al. U.S. Pat. No. 6,377,986. The process started with printing a proprietary barcode within the publication adjacent to the advertisement or editorial content. It further required that the reader install special hardware, the CueCat scanner. Using the scanner, the user would scan the barcode and then the supplemental content would be provided. The implementation, however, was not well received for several reasons. First the system was built on a highly centralized system in which all data on the user was collected and stored on a central server with implications of possible abuse of privacy and user information. Secondly, the system required a special apparatus, the CueCat scanner, that took up precious desk space and added wires. Thirdly, the system was primarily driven to support advertisements and to assist in the targeting of promotional materials to CueCat users.

Accordingly, a need exists for a system and methodology for automatically linking content with an article in a manner that overcomes the deficiencies of prior content-linking systems.

The current invention attempts to overcome the psychological deficiencies of the CueCat system. Although it is possible to utilize the current invention is other ways, in the preferred embodiment, the identity of the user will remain unknown to the system unless explicitly entered by the user for specific web sites. Moreover, the system is much more passive as the reader will automatically and properly decode the information from the RFID tag when the publication containing the RFID tag is placed within the vicinity of the reader. In the preferred embodiment, the power of the antenna/tag combination enables the system to decode tags within 6-8 inches of the reader but this can be adjusted by the use of different antennas. Furthermore, in the ideal implementation, the software will enable the user to disable the system for categories of tag uses as well as for specific web locations. In order to reduce the impact of the system on the user's desk space, multiple versions of the reader/antenna can be made. Such versions can including embedding the antenna within a mouse pad, embedding the antenna within a thin "blotter" or "calendar" pad, attaching the antenna to the side of a monitor, hiding the antenna under the keyboard, attaching the antenna to the underside of the desk surface, or embedding the antenna within a hand-held internet enabled device. Finally, while the CueCat system was based on an advertising model, and while the current invention can be used to supply additional content as part of a sales program, the main application of the program is to provide content relevant to the editorial content of the publication. Careful licensure of the technology will be enforced to avoid invasive uses or uses that have the appearance of jeopardizing privacy in any manner.

SUMMARY OF THE INVENTION

The present invention establishes systems, methods, and apparatus to automatically provide supplemental content for physical objects, most specifically publications.

The system starts with an RFID tag attached to or embedded within the publication or other object. Either before it is affixed, or afterwards, the tag is encoded with data to enable a network connected computer or other device to link to an appropriate URL to obtain appropriate supplemental information.

In the preferred embodiment, at least three of four distinct data fields are encoded. The first is the publication-appropriate "Base URL", the second is a descriptor field or "Prompt Text", the third is the category indicator field, and the fourth is an optional parameters field. The first field specifies the URL which will provide the supplemental content. The second field provides a text description for the user. The third field is designed to allow users to specify categories of content that they would or would not want to see: in the preferred embodiment of the invention the category field consists of multiple sub-fields. In addition to these three fields, a fourth field may be written containing parameters or options to customize the content shown. In the preferred embodiment, these are sent along with the URL to the content provider's system.

For security reasons, in the preferred embodiment of the invention the initial encoding of the RFID data is locked or secured (for example, in a manner such as is described in Mabry et al. U.S. Pat. No. 6,330,971, the disclosure of which is incorporated by reference) so that it cannot be overwritten or changed. This feature ensures that no one can intentionally redirect supplemental content from appropriate content to some alternative site, such as redirecting supplemental information on a comic book to an advertising location or to a pornography site.

The initially encoded data can either be appropriate for the publication at the edition or volume level, or can be appropriate for the specific instance of the publication: i.e. the specific copy.

Common applications in which the encoded data will be at the edition or volume level include most applications for magazines, books, training manuals, workbooks, advertizing materials, and other publications that are identical for all recipients. An example is a magazine or periodical. In this type of application, the same RFID tag information is embedded in the tags within all of the copies of the magazine for a specific edition. All users, then, will have access to the same supplemental content: i.e. the extra content selected by the magazine editors for that particular edition. Normally the tags for such applications will be encoded before the tags are affixed to the publications.

Even when tags are encoded with the same initial data, individualized processing can occur. For instance, a series of student workbooks can be created with all having the same initially coded data. As students work through different sections, of their workbook, the system can keep track of each student's progress. One method of keeping track is to encode the student progress within the RFID chip. This requires that the RFID reader also be able to encode data, and that the workbook be placed near enough the reader to encode the progress data at the end of each session. By passing this stored progress parameter along with the initially encoded URL, the host system can then direct the student to appropriate content based on where the student left off and/or how well the student performed. In the preferred implementation, in addition to the initially encoded data, each RFID tag also contains a unique identifier such as is specified by International Standards Organization ("ISO") 15693, the disclosure of which is incorporated by reference. Based on this identifier, the host system can automatically keep track of the lessons covered at the end of each session, and thereby start each new session with content based on where the student left off the last time based on the unique tag identifier. This is achieved by first including a specific key within the optional parameter (i.e. "#tag#"), and then replacing that key with the unique identifier so that it becomes part of the final URL string that is sent to the remote server to determine the appropriate supplemental content. In the preferred embodiment, then, nothing in the system requires that the particular student's identity or personal information be recorded, stored, or used in any way.

Publications that include access to supplemental services can also be implemented without requiring use of personal identification. For example, if the purchase of a publication entitles the owner to download some specialized software or other file, the system can keep track of the use in the same way that it does for customized content based on use as described above with student workbooks. If the reader can also encode data, the system can write information to the tag showing that the file has been downloaded. In the preferred embodiment, the host system will keep track of the unique RFID tag identifiers to control the download process. Furthermore, publication-specific software could easily validate the publication by requiring that the publication RFID encoded information and possibly the specific RFID tag identifier be read at the start of each execution and checked against stored parameters in order for the software to continue.

Applications with encoded data specific to the individual copy will generally be publications that are created specifically for one individual. In such instances the supplemental content will normally be selected specifically for the user for whom the publication was created. One example of such an application is a report on a specific student's performance on an assessment. In this instance, coded information on the tag can direct the child, parent, or teacher to specific content selected to be appropriate for further instruction and learning by the student. In the preferred embodiment, this is accomplished by storing in the RFID tag a URL as the first data field along with parameters describing the student performance as the third data field so-that the host can build a customized page including appropriate links and content. In the preferred embodiment, then, nothing in the system requires that the particular student's identity or personal information be recorded, stored, or used in any way.

In the preferred embodiment the data fields encoded in the chip are generally straight text data. Since the system uses standard RFID tags that meet the ISO/ICE 18000 Series standards, the URL, category code, and optional parameters can be read by any RFID reader that is compliant with the appropriate standard, and the fields can easily be understood. Since the number of bits that can be encoded is limited, in some tags it may be necessary to adopt a compression system to minimize the number of bits to store the URL and other data fields. If required for security or other reasons, the current invention can utilize codes in lieu of text data and/or encryption instead of straight text so that only special software used by authorized personnel can get useful information from the publication. In the instance of using codes, a unique code is created for each URL and the URL is identified through the code. This approach, however, generally requires that the table be maintained on a centralized database that is used to update a mirror table or derivative table on the user's computer or that the centralized system control the linking process. The use of such a centralized system created much of the resistance to the failed CueCAT system. In the case of encrypted data, only an authorized system with the appropriate key could use the encrypted data on the chip and successfully decrypt the fields for processing.

The system works using a straight forward RFID reader design with electronic circuitry between an RFID antenna and the user's computer or other internet connected device, normally following standards as established by the ISO. In the preferred embodiment for standard computers, a small electronic package is used to hold the electronic circuitry to read the RFID tags within the publications such as the "RightEngine RFID Module" produced by RightTag, Inc. of Santa Clara, Calif., USA (www.righttag.com). The electronic package has two cables: one goes to a standard USB port in the computer and the other goes to the RFID antenna. In the preferred embodiment, the RFID antenna can be selected from one of several package choices such as (a) within a mouse pad, (b) in a desktop "blotter pad" or "calender pad" holder, (c) under the desk surface (non-metal desks), (d) under the keyboard, or (e) attached to the computer monitor. For other internet enabled devices, the RFID reader can be built into the device with the antenna packaged within the device.

In the preferred embodiment of the invention, the RFID reader is directly attached to the internet enabled device such as through a USB cable. It is possible to implement embodiments with other connections such as firewire, serial, parallel, or wireless.

The system also includes custom software. Designed to run continuously, the software for the preferred embodiment is designed to recognize when a publication is placed close enough to the reader to be read. In the preferred embodiment, the reader runs in "continuous read" mode so that it sends the read results to the computer each time a new tag is read. The software monitors the USB connection, and processes all tag information received from the reader. When the fields from a new tag are received, the software takes one of three actions depending on the URL (field 1), the category (field 3) and settings established by the user. If the category or URL has been flagged as "block", the tag is ignored. If the category or URL has been flagged as "automatic", then the software opens a standard browser with a new window with the requested URL. Otherwise, the software prompts the user asking whether or not to link to the URL with the prompt being based on the description in field 2. In the preferred embodiment the prompt is "Connect to" prepended to the description. If the user responds "yes", the software opens a standard browser with a new window and the requested URL. If the user responds "no" the tag is treated as if it were flagged as "block" and ignored. The prompt can also be expanded to concurrently tag future actions: for example if the user responds "always" the system can flag the URL as "always" and if the user responds "never", the system can flag the URL as "block".

When the browser window is opened, if there are additional parameters (field 4), the parameter values are added to the URL.

Additional functions are included in the software such as screens to allow the user to set preferences by category, domain, and/or specific URL. Choices include "automatic", "ask", and "block". Further ancillary functions include pausing and restarting the continuous monitoring of the RFID reader, reconnecting or connecting to the last tag identified, providing help on the software, etc.

Alternative sources of content: Although the primary application of this invention is intended to retrieve supplemental content through a standard browser connected to a content-providing server on a network or the internet, the same invention can be used to provide content from other sources. An appropriate source of content can be a removable media such as a CD, DVD, flash card, Memory Stick, or microdrive. Alternatively, the content can be stored on a hard drive, non-volatile memory module, or other media storage contained within the computer or specialized device. The invention can also be in systems that do not utilize standard browsers to present the content. For example, content could be primarily auditory and therefore presented via appropriate multi-media software such as RealNetwork's RealPlayer, or Microsoft Incorporated's Media® player. Even when the content primarily consists of graphics and/or text, the viewer may be a custom viewer rather than a standard browser, and may even be incorporated into the system itself.

Alternative implementations: The above description and the detailed descriptions below are based on the currently preferred embodiment that was developed to demonstrate the current invention and may not be the same as an implementation released for large scale utilization. It should be apparent to anyone skilled in the art that many variations to the preferred embodiment can be implemented and that the software and hardware described herein is only one possible embodiment of the underlying invention.

As an example of an alternative implementation, a system can be based exclusively on the unique RFID tag identification so that it is not necessary to encode special data on the RFID chip to associate it with a particular publication. Such a system will treat the unique identification as a code or key to the supplemental content, and a central database will be used to locate the supplemental content based exclusively on the unique RFID tag identification as a key. Consider, for example, an application designed to provide supplemental content for exhibits in a lawsuit. Using standard procedures, documents are generally tagged with human-readable labels or are stamped so that the exhibit's owner and exhibit number can be read (e.g. "Plaintif Exhibit 01003"). In this application, an RFID tag is applied to each document. Then the document is placed near an RFID reader and special software is used to create an entry in a database containing the RFID unique code (obtained from the RFID chip), the exhibit owner and number (entered by a clerk), and any other relevant data fields such as title, date, author which are also entered by a clerk. Note that in some sophisticated systems, much of the clerical entry can be overcome by specialized document processing software. Whenever the document is subsequently placed near an RFID reader, the system will automatically display all relevant information about the document on the user's computer screen. In such a system, additional information can be added by users including summaries, notes, highlights, questions and answers from depositions, and so forth.

BRIEF DESCRIPTION OF THE DRAWINGS

The accompanying drawings, which are incorporated herein and form part of the specification, illustrate various embodiments of the present invention and, together with the description, further serve to explain the principles of the invention and to enable a person skilled in the pertinent art to make and use the invention. In the drawings, like reference numbers indicate identical ate identical or functionally similar elements. A more complete appreciation of the invention and many of the attendant advantages thereof will be readily obtained as the same becomes better understood by reference to the following detailed description when considered in connection with the accompanying drawings, wherein:

FIG. 3 shows the data fields encoded on the RFID tag in the preferred embodiment.

FIG. 8 shows a typical popup menu with ancillary functions.

DETAILED DESCRIPTION OF THE EXEMPLARY EMBODIMENTS

In the following description, for purposes of explanation and not limitation, specific details are set forth, such as particular networks, communication systems, computers, terminals, devices, components, techniques, data and network protocols, software products and systems, enterprise applications, operating systems, enterprise technologies, middleware, development interfaces, hardware, etc. in order to provide a thorough understanding of the present invention. However, it will be apparent to one skilled in the art that the present invention may be practiced in other embodiments that depart from these specific details. Detailed descriptions of well-known RFID devices, networks, communication systems, computers, terminals, devices, components, techniques, data and network protocols, software products and systems, enterprise applications, operating systems, enterprise technologies, middleware, development interfaces, and hardware are omitted so as not to obscure the description of the present invention.

Figure 1:
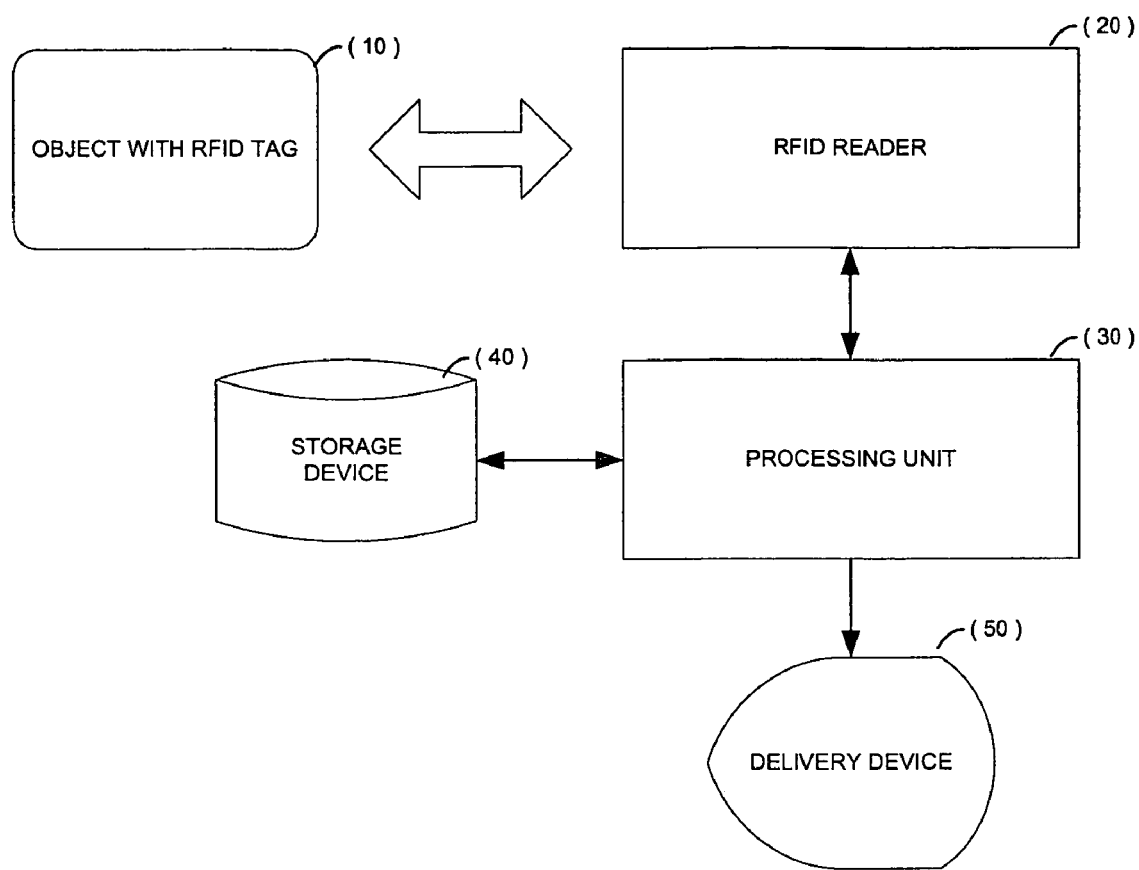
FIG. 1 shows a block diagram with the major components of the system for linking an object with an RFID tag to supplemental content.

FIG. 1 shows a high level functional diagram of the basic components needed to implement a system to link an object with an RFID tag to supplemental content. These components include an object with an RFID tag (10) embedded or attached, an RFID reader (20) capable of reading the tag (10), a digital processing unit (30), a storage device (40), and a delivery device (50). When an object with an RFID tag (10) is placed within range of the RFID reader (20), the RFID reader reads the digital data from the RFID tag. The data as read is then transferred to the processing unit (30) which uses the data to retrieve the supplement content from the storage device (40) and deliver the content through the delivery device (50).

Figure 2:
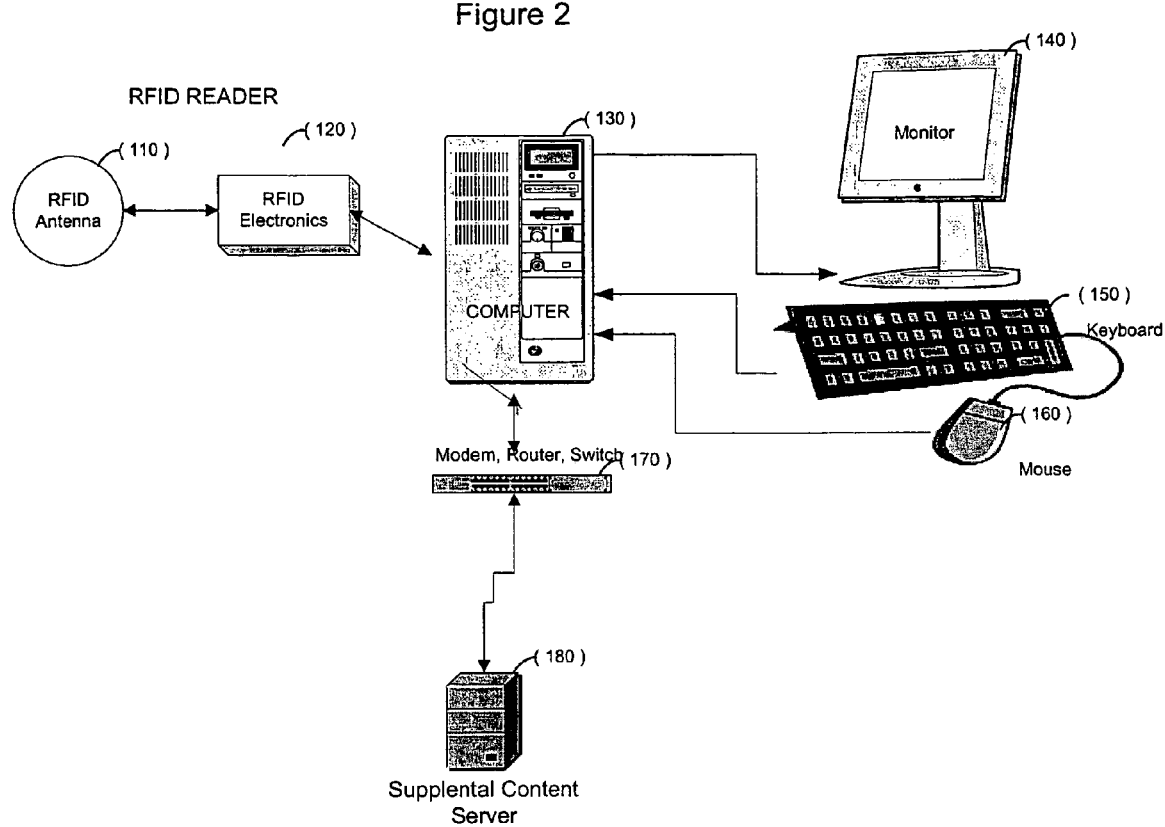
FIG. 2 shows the components for the preferred embodiment of the system for linking a publication to appropriate supplemental content using the internet or other network.

FIG. 2 shows the components for a system for linking a publication to appropriate supplemental content using the internet or other network as embodied in the preferred embodiment. The system consists of an RFID Reader, a computer, means to connect to a network or internet, a source of supplemental content from a network or internet server, and means for a user to interact with the computer. In the diagram, the RFID Reader is shown as consisting of two parts, an antenna (110) and an electronic package (120). The RFID Electronic package (120) is connected to the antenna (110) via a cable or wire, and is also connected to the computer (130) through a USB connection. Standard user interface components include, but are not limited to, a monitor (140), keyboard (150), and mouse (160). The computer is shown to be connected to a "modem, router, or switch" (170). This connection may be via an ethernet cable, wireless connection, serial cable, or other connection depending on the specific hardware. From the appropriate hardware (170) standard network systems are employed to connect to a server (180) which has or can prepare the appropriate supplemental content.

As described in more detail below, the core of the system involves connecting supplemental content to a publication in which the publication is identified by an RFID tag attached to or embedded within the publication. When the publication with the RFID tag is in close proximity to the RFID antenna (110), the RFID reader electronics package (120) recognizes the presence of the tag and reads the contents of the tag using standard RFID techniques. In the preferred embodiment of the invention, the electronics package uses technologies developed by RightTag, and the communication between the RFID electronics package and the software on the computer utilizes the interface software provided by RightTag.

Software within the computer (130) transfers the tag data from the RFID electronics package (120) to the main computer memory via the USB port. If the user needs to be prompted to determine the appropriate action for the publication, the software displays a question on the computer monitor (140) and the user responds with either the keyboard (150) or mouse (160). If the final action for the publication is to connect to the appropriate link, the software opens a new browser window on the monitor (140), and the browser fetches the appropriate supplemental content by sending the appropriate URL and optional parameters as needed to the server (180) using standard internet or network protocols. As shown in the figure, the computer is typically connected to a piece of hardware that enables the browser to communicate with other devices on the internet or network. This hardware is typically a modem, a router, or a switch (170).

FIG. 3 shows the data fields stored on the RFID chip in the currently preferred embodiment. In accordance with ISO standards, most RFID tags include a unique indentifier (210). Note that this unique identifier is not encoded as part of the system whereas the four data fields are encoded onto the chip, typically before the chip is affixed to the publication. The first data field (220) specifies a Base URL, namely the appropriate link for the publication. The second data field specifies the prompt (230) associated with the publication. The third data field specifies the category codes (240) associated with the publication. The fourth data field specifies any particular parameters (250) that need to be sent to the URL in association with the publication. The sample data values (210' through 250') show the values that might be used for a specific edition of a magazine, namely the Aug. 30, 2004 Mc edition of the publication "BusinessWeek". (Copyright 2004, The McGraw-Hill Companies, Inc.)

The currently preferred embodiment of the system includes specialized software, "MGHLink.exe" which can be seen as consisting of three major components: "Program Intialization", "RFID Read Loop", and "Ancillary functions", each of which is described in more detail below.

Figure 4:
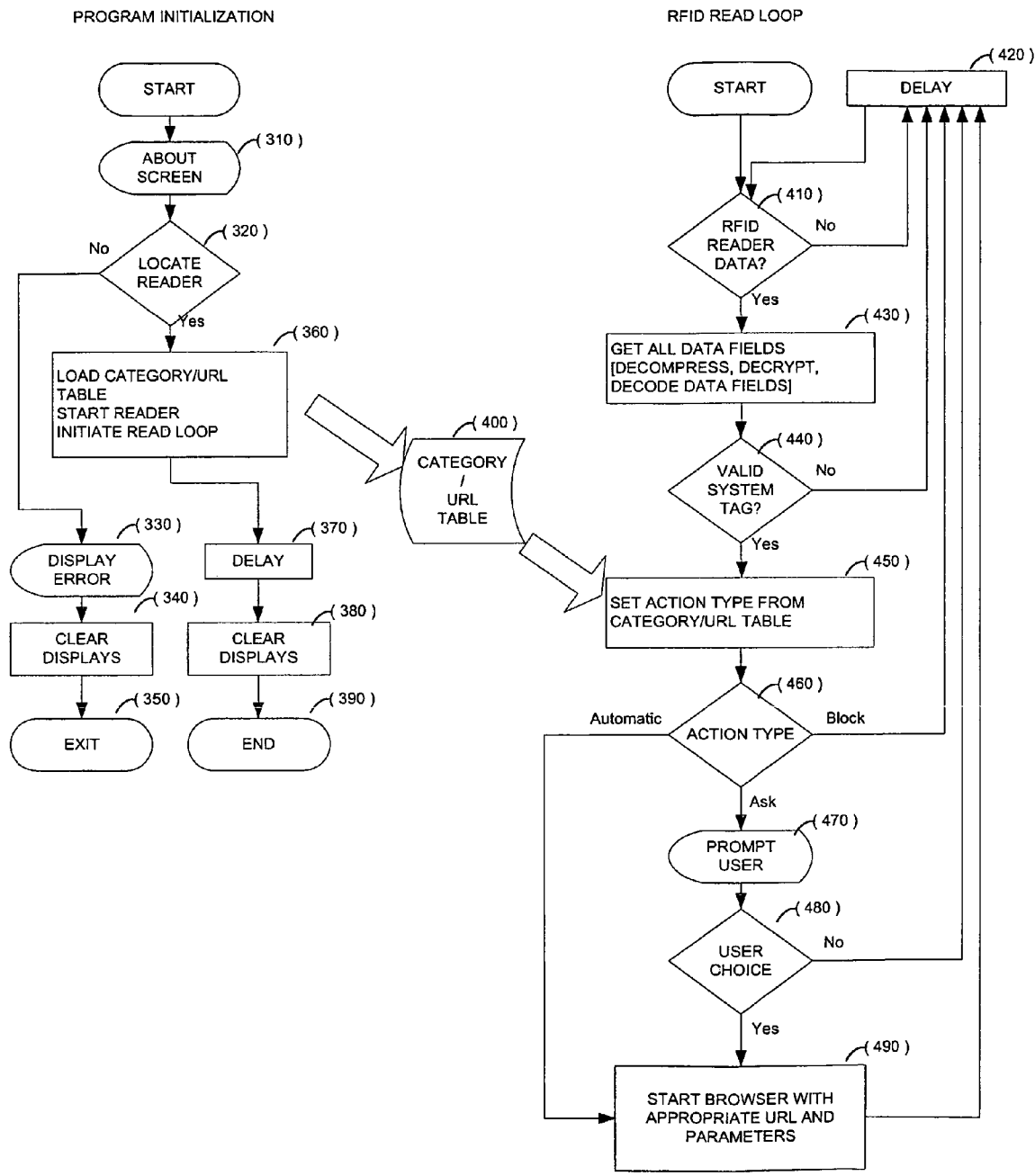
FIG. 4 is a block diagram showing the main components of the software in the preferred embodiment.
Figure 6:
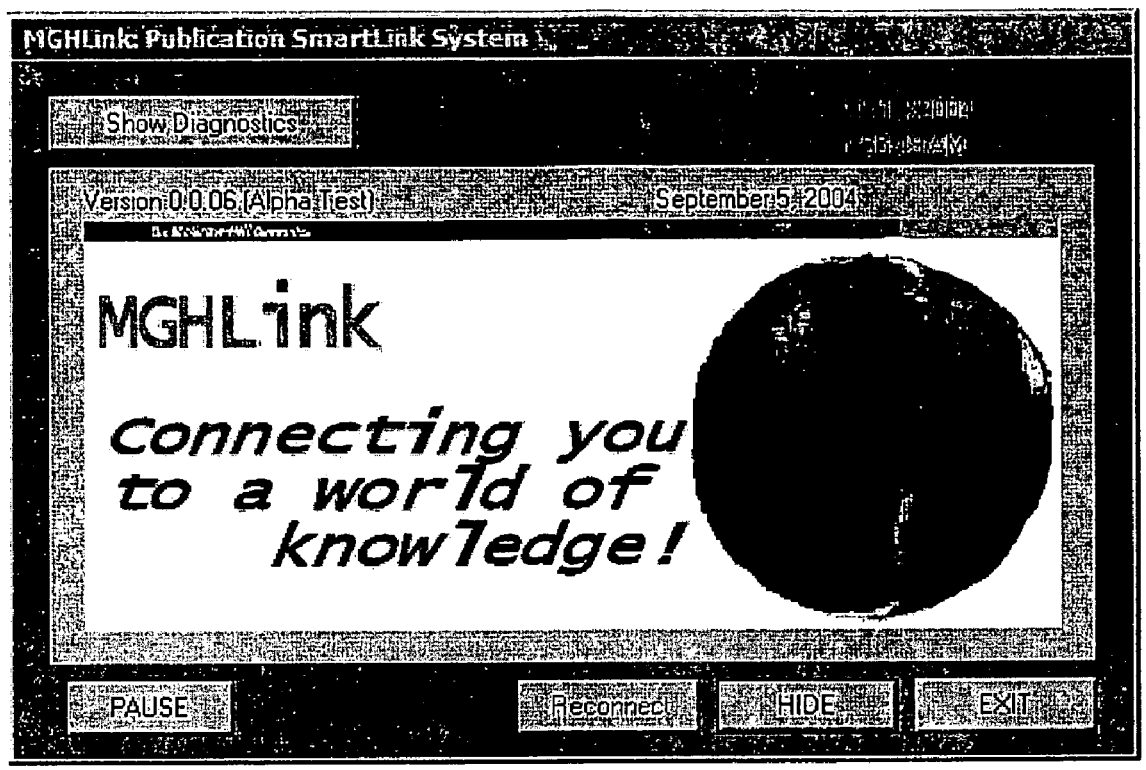
FIG. 6 shows a typical "About Screen" as presented on a computer monitor.

In FIG. 4, the "Program Initialization" component is shown as a functional block diagram. When the MGHLink software is first executed the program initialization component is processed. The MGHLink software is typically first executed automatically when the computer is started or when a user logs onto the computer, but may be set up to only start when explicitly initiated by the user or some specific event. In the preferred embodiment, during the program initialization, an "About Screen" such as that in FIG. 6 is presented. The "About Screen" is displayed at the beginning of the initialization process (310), and removed at the end (340 or 380). The program initialization attempts to locate the connection to the electronics in the RFID reader (320). In the preferred embodiment, all communication to the RFID reader electronics (FIG. 2, 120), is through a special API provided by RightTag for readers based on their designs. If the software is unable to locate an RFID reader, it notifies the user with an appropriate error message (330), removes the displays (340) and terminates the program (350).

If the RFID Reader is located, the program initialization performs a sequence of procedures (360) to start the process of recognizing publications through their RFID tags and then taking appropriate actions. First it loads a table (400) of action types for categories, domains, and specific URLs into memory. In the preferred embodiment of the invention, this table is maintained in an "INI" file format on a hard drive, but it can be maintained in a system registry, in non-volatile memory, or other storage medium. If there is no table, the system builds a default table with entries only for the main categories. Within the table, each entry is set as "Automatic", "Block", or "Ask". The use of these entries is described below.

One the table has been loaded and prepared for processing, the RFID Reader is started. In the preferred embodiment, the RFID reader is set into "continuous read" mode so that it will recognize and read any RFID tag that is within range. Finally, the RFID read loop is started so that the software can process any data from the RFID Reader. Once the RFID Read Loop is started, the program initialization waits (370), and then removes the "About Screen" display (380) before terminating (390).

FIG. 4 also contains a functional block diagram for the RFID Read Loop which is the main software component for the system. The RFID Read Loop normally runs continuously, but may be suspended and restarted as will be shown below. For any execution of the system, the RFID Read Loop is started by the program initialization component as shown above (320). When it is running, the RFID Read Loop first checks to see if the RFID Reader has obtained data from a new tag (410). In the preferred embodiment, this is achieved through an interrogation of the RFID electronics using an API call from RightTag. If there is not a set of new data available, the system goes into a delay (420), and then tries again after the specified delay.

If data from a tag is available, the RFID Read Loop goes through a series of procedures. First it performs a sequence of fixed procedures (430) to get the appropriate data fields. Within this sequence of procedures, it first obtains all of the data fields as shown in FIG. 3. In the preferred embodiment of the invention, this is accomplished by interrogating the RFID electronics using an API call from RightTag, Inc. This sequence can also include an expansion process to expand the data fields if they are compressed, a conversion procedure to convert the data from codes to text if the data fields are stored as codes, and/or a decryption process to decrypt the data fields if they are encrypted.

Since the tags used in the preferred implementation comport to ISO standards, there are other tags that will be recognized by the reader, but that are not intended to be used to link to supplemental data, and the system needs to only process those tags intended to link to supplemental content. Once the data fields are ready, the system tests to see if the tag is appropriate for automatic linkage to supplemental content. In the preferred embodiment, all tags intended to link to supplemental content must have data in field 3 (category codes), and the first part of the data comprises a specified string, such as "MGHLink:" to indicate (a) that the tag is intended to be used to trigger a link to supplemental data, and (b) that the program "MGHLink.exe" is the appropriate implementation of the invention to process the tag. In the preferred embodiment, then, the system tests to see if field 3 starts with the string "MGHLink:" (440). If the test fails, the tag is effectively ignored, and the loop continues in its delay/check cycle (420, 410). If the test succeeds, an additional procedure is processed so the system can determine and then execute any appropriate action for the tagged publication. In the preferred embodiment, this procedure determines the appropriate "Action Type" ("automatic", "ask", or "block") for the specific publication (450). The Action Type is initially set to "ask", and may be changed based on entries in the table. First the category codes field (field number 3) is checked. If a corresponding table entry for one or more categories is stored in the table as "block", the action type is set to "block", otherwise if a corresponding table entry for one or more categories is stored in the table as "automatic", the action type is set to "automatic". The Base URL (field number 1), is then stripped to the "domain", or the root level of the URL. If there is a table entry for that domain, the action type is set to the entry for the domain. Finally, if there is a table entry for the entire Base URL, the action type is set to the entry for the Base URL.

Figure 7:
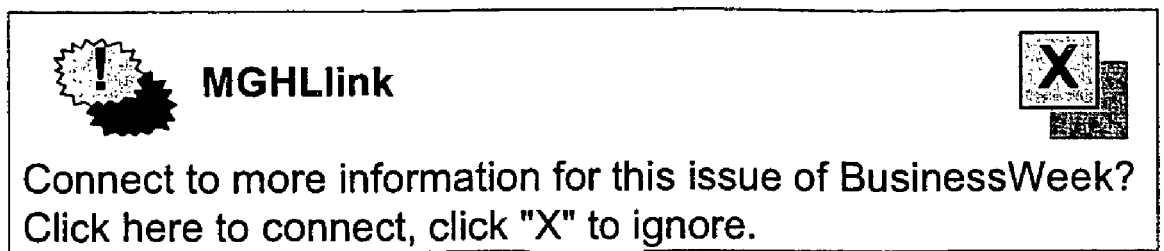
FIG. 7 shows a typical notification area on a computer screen showing that supplemental content is available for a specific publication.

Once the Action Type has been determined, the RFID Read Loop takes appropriate action based on the value of the Action Type (460). If the Action Type is "block", the tag is effectively ignored, and the loop continues in its delay/check cycle (420, 410). If the Action Type is "ask", the RFID Read Loop queries the user to determine the appropriate action. First the system builds a prompt for the user and displays it (470). In the preferred embodiment, the prompt consists of the text "Connect to" plus the Prompt Text data field (FIG. 3, 230) plus a question mark, such as "Connect to more information for this issue of BusinessWeek?". In the current embodiment of the invention, this prompt is displayed on the computer monitor (FIG. 2, 140) as a "bubble" attached to a system tray icon such as shown in FIG. 7. The system then waits for the user to make a choice (480). If the user responds in the negative either through the keyboard (FIG. 2, 150), via the mouse (FIG. 2, 160), or by simply ignoring the prompt for a specified period of time, the tag is effectively ignored and the loop continues in its delay/check cycle (420, 410). If the user responds in the positive, or if the Action Type is "automatic", the system goes through a series of procedures (490) to display the supplemental content to the user.

To display the supplemental content, the system uses the default browser on the computer, and relies on the browser and system operating system to establish an appropriate connection to the network or internet through an appropriate modem, router or switch (FIG. 2, 170). The RFID Read Loop first prepares a fully qualified URL for the browser. The first part of the fully qualified URL is the "Base URL" data field (field number 1). Additionally, the "Parameters" data field (field number 4) is appended to the fully qualified URL. In the preferred embodiment, if the "Parameters" data field contains the special string #tag#, within the fully qualified URL, the string #tag# is replaced with the unique TAG identification from the RFID tag. This special process permits processing based on a specific instance of a publication.

Once the fully qualified URL has been created, the RFID Read Loop invokes the default browser and passes the fully qualified URL to it. Once the browser has established connection to the network or internet, standard procedures are used to connect the browser to the remote server that will supply the supplemental content (FIG. 2, 180). Based on the fully qualified URL, the remote server then provides the appropriate supplemental content for the browser to display on the user's monitor.

Figure 5:
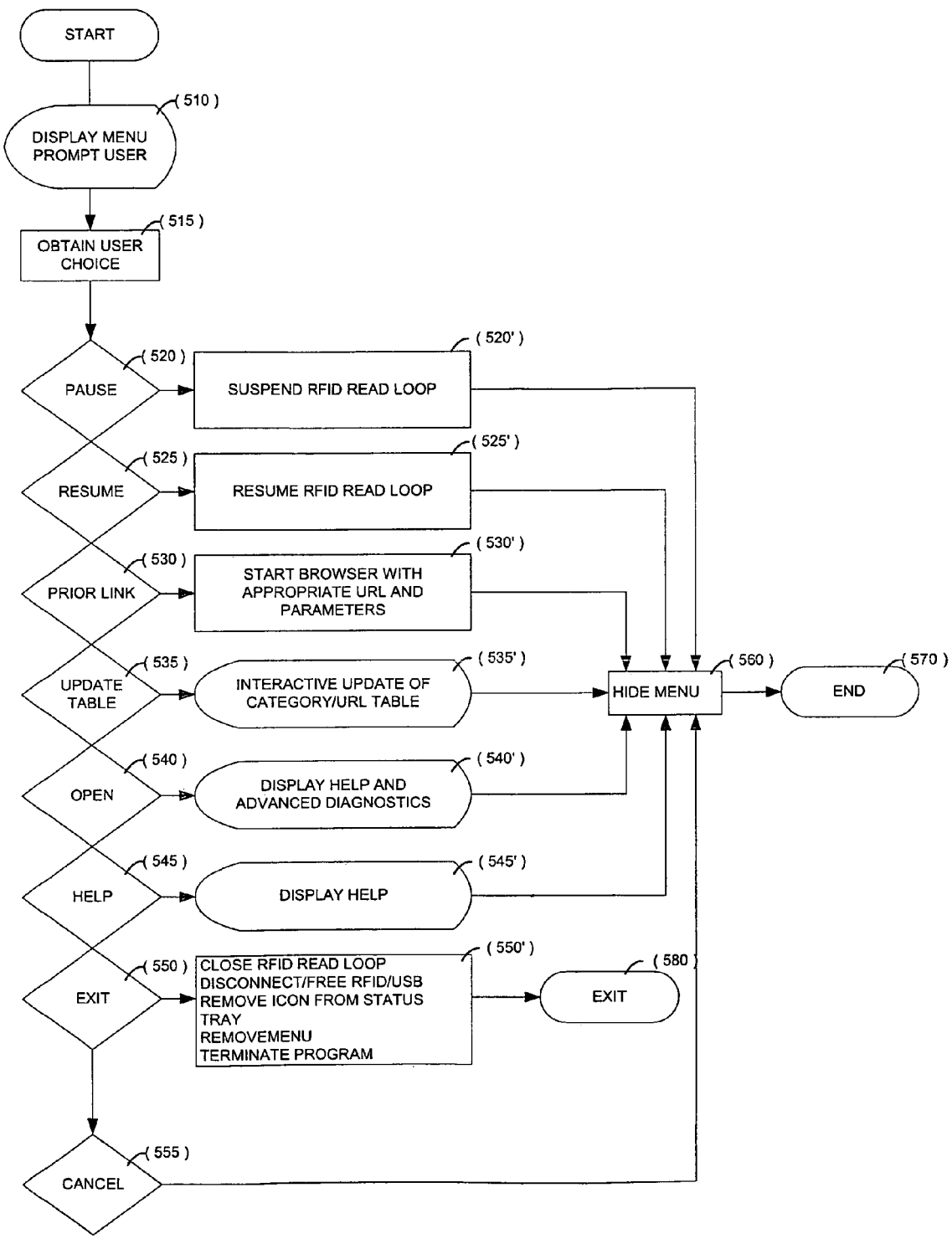
FIG. 5 is a block diagram showing the ancillary function component of the preferred embodiment showing the ancillary functions available to the user via a popup menu.

In addition to the two main software components described above and shown in FIG. 4, there can be a series of ancillary software functions processed by the ancillary functions component. FIG. 5 is a block diagram showing ancillary functions component implemented in the preferred embodiment. When the user does a "right click" on the MGHLink icon in the system tray on the user's monitor, a menu of ancillary functions is displayed (510) to provide the user with the opportunity to make a selection. The ancillary menu as implemented in the preferred embodiment is shown in FIG. 8. The system then waits for a user choice (515). Based on the item selected by the user, one of the functions is executed as shown. If the user selects "Pause" (520), the ancillary functions component executes a set procedure (520') that suspends or stops the RFID Read Loop as explained above. The component then hides the ancillary menu (560) and suspends its operation (570).

If the RFID Read Loop has been suspended (paused), the user can choose the "Resume" option. If the user selects "Resume" (525), the ancillary functions component executes a set procedure (525') that starts the RFID Read Loop as explained above. The component then hides the ancillary menu (560) and suspends its operation (570).

If the user selects "Prior Link" (530), the ancillary functions component executes a set procedure (530') that treats the last displayed link as if it were set to "automatic" whether or not the user chose to link to the supplemental content when it was first shown using the same procedures as explained above for linking to supplemental content from the RFID Read Loop (470). The component then hides the ancillary menu (560) and suspends its operation (570).

If the user selects "Update" (535), the ancillary functions component executes a set procedure (535') that opens up a new window and allows the user to add, edit, and/or delete entries in the Category/URL Table (400). The component then hides the ancillary menu (560) and suspends its operation (570).

If the user selects "Open" (540), the ancillary functions component executes a set procedure (540') that displays the system "About Screen" and makes functionality within the About Screen accessible. The component then hides the ancillary menu (560) and suspends its operation (570).

If the user selects "Help" (545), the ancillary functions component executes a set procedures (545') that opens a standard Windows "help file" containing instructions on the MGHLink program. The component then hides the ancillary menu (560) and suspends its operation (570).

If the user selects "Exit" (550), the ancillary functions component executes a set procedure (550') that shuts down the entire system. First, it stops the RFID Read Loop, then it stops the RFID reader and releases the RFID-USB connection. It then removes the ancillary functions menu, removes the icon from the system status tray, and terminates executive of MGHLink (580).

If the user does not select any of the menu choices, but closes the menu or moves away from it and clicks elsewhere on the screen, the action is treated as "Cancel" (555) and the ancillary functions component then hides the ancillary menu (560) and suspends its operation (570).

Additional ancillary functions can be added, such as a history or list of previously or recently utilized links, different category/code tables for each user, or access to diagnostics functions.

The current invention relates, generally, to the presentation of supplemental content for an object based on identifying the object through an embedded or attached RFID tag which contains the data necessary and sufficient to retrieve the supplemental content so that it can be delivered on an appropriate delivery device. While this invention is primarily directed to linking a publication to content retrieved from a network or the internet, it can be advantageously applied to other applications that require retrieving supplemental content for a document or other physical object to which an RFID tag has been attached or embedded.

The foregoing has described the principles, embodiments, and modes of operation of the present invention. However, the invention should not be construed as being limited to the particular embodiments described above, as they should be regarded as being illustrative and not as restrictive. It should be appreciated that variations may be made in those embodiments by those skilled in the art without departing from the scope of the present invention.

What is claimed is:

1. A method for providing supplemental content comprising:
    encoding a URL in an RFID tag;
    attaching or embedding the RFID tag to an article which conveys content to a user of the article;
    reading digital data, including said URL, from said RFID tag using a reader adapted to read digital data from an RFID tag;
    transmitting said digital data to a processing device adapted to detect the presence of said URL;
    accessing a supplemental content web page corresponding to said URL from a storage device if said processing device detects the presence of said URL in the digital data read from said RFID tag by said reader, said supplemental content web page including supplemental content relating to the content conveyed by the article;

transmitting said supplemental content web page to a delivery device adapted to deliver web page content;

delivering said supplemental content via said delivery device;

generating content interaction data, said content interaction data being reflective of a user's interaction with the supplemental content, the content interaction data being readable by said reader; and in connection with subsequent access to supplemental content, using the content interaction data to determine which supplemental content located in accordance with the supplemental content-accessing data, shall be retrieved and delivered to the user.

2. The method of claim 1, wherein the article is selected from the group comprising: a publication, software, portable audio-visual recording media, portable audio recording media, and packaging.

3. The method of claim 1 in which the processing device is a computer.

4. The method of claim 1 in which the delivery device is a computer monitor.

5. The method of claim 1 in which the storage device is accessed by a server on a communication network.

6. The method of claim 5 wherein the processing device is a computer and the delivery device is a computer monitor.

7. The method of claim 6 wherein the step of accessing a supplemental content web page further comprises the steps of:

establishing a connection from the computer to the server;

the computer automatically sending the URL to the server;

the server using the URL to access the content stored in the storage device; and using a browser to display the content associated with the URL provided by the server.

8. The method of claim 1, further comprising writing the content interaction data to the RFID tag.

9. A method for providing digital supplemental content comprising:

encoding supplemental content-accessing data in an RFID tag, said supplemental content-accessing data including a URL for a server adapted to access content within a digital storage medium and transmit said content over a digital communication network;

attaching or embedding the RFID tag to an article which conveys content to a user of the article;

reading digital data, including the supplemental content-accessing data, from said RFID tag using a reader adapted to read digital data from an RFID tag;

transmitting the supplemental content-accessing data to a computer in communication with the reader;

using the computer to automatically establish a connection to the server;

using the computer to automatically send the URL to the server to access supplemental content associated with the URL within the digital storage medium;

retrieving the supplemental content associated with the URL, said supplemental content associated with the URL including supplemental content relating to the content conveyed by the article;

transmitting said retrieved supplemental content with the server to a delivery device adapted to deliver said retrieved content;

using a browser to display the supplemental content associated with the URL provided by the server;

generating content interaction data, said content interaction data being reflective of a user's interaction with the supplemental content, the content interaction data being readable by said reader; and in connection with subsequent access to supplemental content, using the content interaction data to determine which supplemental content located in accordance with the supplemental content-accessing data, shall be retrieved and delivered to the user.

10. The method of claim 9, wherein the article is selected from the group comprising: a publication, software, audio-visual recording media, audio recording media, and packaging.

11. The method of claim 9, further comprising writing the content interaction data to the RFID tag.

12. A system for providing digital content comprising:

an RFID tag encoded with supplemental content-accessing data, said supplemental content accessing data including a URL defining a location within a digital storage medium at which the supplemental content is stored;

an article to which said RFID tag is attached or embedded, wherein said article conveys content to a user and said supplemental content is related to the content conveyed by the article;

a reader adapted to read digital data, including said supplemental content-accessing data, from said RFID tag;

a server in communication with said reader and constructed and arranged to receive the URL and retrieve content from the location identified by said URL;

a browser in communication with said server and constructed and arranged to display the supplemental content retrieved by said server;

an RFID coding device constructed and arranged to write content interaction data to the RFID tag, said content interaction data being reflective of a user's interaction with the supplemental content, the content interaction data being readable by said reader, wherein, in connection with subsequent access to supplemental content, the content interaction data is used by the server to determine which supplemental content located in accordance with the supplemental content-accessing data, shall be retrieved and delivered to the user.

13. The system of claim 12, wherein said article is selected from the group comprising: a publication, software, audio-visual recording media, audio recording media, and packaging.

14. The system of claim 12 in which the delivery device is a computer monitor.

* * * * *